United States Patent
Sordelet et al.

(10) Patent No.: US 11,859,290 B2
(45) Date of Patent: Jan. 2, 2024

(54) THIN COATINGS FOR HYDRAULIC COMPONENTS

(71) Applicant: Caterpillar Inc., Peoria, IL (US)

(72) Inventors: Daniel Joseph Sordelet, Dunlap, IL (US); Kurt Steven Goslovich, Naperville, IL (US); Steven Jon Henderson, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/643,343

(22) Filed: Dec. 8, 2021

(65) Prior Publication Data

US 2023/0175111 A1    Jun. 8, 2023

(51) Int. Cl.
*C23C 4/10* (2016.01)
*C23C 4/02* (2006.01)
(Continued)

(52) U.S. Cl.
CPC ............... *C23C 4/10* (2013.01); *B32B 15/04* (2013.01); *B32B 15/043* (2013.01); *B32B 15/16* (2013.01);
(Continued)

(58) Field of Classification Search
CPC .. C23C 4/10; C23C 4/02; C23C 4/129; C23C 4/18; C23C 4/04; C23C 4/06;
(Continued)

(56) References Cited

U.S. PATENT DOCUMENTS

| 6,004,372 A | 12/1999 | Quets |
| 8,790,789 B2 | 7/2014 | Ramgopal et al. |

(Continued)

FOREIGN PATENT DOCUMENTS

| CN | 103276341 A | 9/2013 |
| CN | 110331358 A | 10/2019 |

(Continued)

OTHER PUBLICATIONS

Otsima in "Material Selection Process for Hydraulic Cylinder" (Feb. 2015) (24 pages), downloaded from www.researchgate.net. (Year: 2015).*

(Continued)

*Primary Examiner* — Michael E. La Villa
(74) *Attorney, Agent, or Firm* — Lee & Hayes, P.C.

(57) ABSTRACT

An example hydraulic system component of a machine includes a protective coating deposited by high velocity air fuel (HVAF) thermal spray, exhibiting high adhesion strengths and surface morphologies that promote lubricant adhesion and reduce the leakage of oil and/or hydraulic fluid from the hydraulic system. The coating may have surface roughness with $R_z$ values less than 2 μm and hardness of 1000 Vickers or greater. The HVAF coating may be thinner than conventional coatings with thicknesses less than 100 μm. The HVAF coating may be deposited on a variety of steel components with adhesion strengths greater than those achieved by high velocity oxygen fuel (HVOF). The HVAF coating may be formed without time consuming roughening and/or post-grind operations, resulting in cost savings compared to conventional coatings. The coatings may have operational lifetimes of 1000 hours or more.

17 Claims, 7 Drawing Sheets

(51) Int. Cl.
  *C23C 4/129* (2016.01)
  *C23C 4/18* (2006.01)
  *B32B 15/04* (2006.01)
  *B32B 15/18* (2006.01)
  *C23C 4/067* (2016.01)
  *C23C 4/123* (2016.01)
  *C23C 4/134* (2016.01)
  *B32B 15/16* (2006.01)
  *B32B 18/00* (2006.01)
  *C23C 4/04* (2006.01)
  *C23C 4/06* (2016.01)
  *C23C 4/12* (2016.01)
  *C23C 28/04* (2006.01)
  *C23C 28/00* (2006.01)

(52) U.S. Cl.
  CPC .............. *B32B 15/18* (2013.01); *B32B 18/00* (2013.01); *C23C 4/02* (2013.01); *C23C 4/04* (2013.01); *C23C 4/06* (2013.01); *C23C 4/067* (2016.01); *C23C 4/12* (2013.01); *C23C 4/123* (2016.01); *C23C 4/129* (2016.01); *C23C 4/134* (2016.01); *C23C 4/18* (2013.01); *C23C 28/04* (2013.01); *C23C 28/044* (2013.01); *C23C 28/341* (2013.01); *B32B 2255/06* (2013.01); *B32B 2255/20* (2013.01); *Y10T 428/1284* (2015.01); *Y10T 428/12576* (2015.01); *Y10T 428/12847* (2015.01); *Y10T 428/12854* (2015.01); *Y10T 428/12931* (2015.01); *Y10T 428/12937* (2015.01); *Y10T 428/12972* (2015.01); *Y10T 428/12979* (2015.01); *Y10T 428/12993* (2015.01); *Y10T 428/2495* (2015.01); *Y10T 428/24967* (2015.01); *Y10T 428/24983* (2015.01); *Y10T 428/26* (2015.01); *Y10T 428/263* (2015.01); *Y10T 428/264* (2015.01); *Y10T 428/265* (2015.01)

(58) Field of Classification Search
  CPC ........... C23C 4/067; C23C 4/12; C23C 4/123; C23C 4/134; C23C 28/04; C23C 28/044; C23C 28/341; B32B 15/04; B32B 15/043; B32B 15/18; B32B 15/16; B32B 2255/06; B32B 2255/20; B32B 18/00; Y10T 428/263; Y10T 428/264; Y10T 428/265; Y10T 428/26; Y10T 428/2495; Y10T 428/24967; Y10T 428/24983; Y10T 428/12576; Y10T 428/12972; Y10T 428/12979; Y10T 428/12993; Y10T 428/1284; Y10T 428/12847; Y10T 428/12854; Y10T 428/12931; Y10T 428/12937
  See application file for complete search history.

(56) References Cited

U.S. PATENT DOCUMENTS

| | | | | |
|---|---|---|---|---|
| 2009/0191416 | A1* | 7/2009 | Verstak | C23C 4/129 |
| | | | | 428/457 |
| 2017/0335918 | A1* | 11/2017 | Iseki | C22C 19/05 |
| 2018/0245638 | A1* | 8/2018 | Sordelet | C23C 4/131 |
| 2020/0270733 | A1 | 8/2020 | Verdell | |
| 2020/0378411 | A1* | 12/2020 | Luc | F15B 15/1457 |
| 2021/0148471 | A1 | 5/2021 | Murugesan et al. | |

FOREIGN PATENT DOCUMENTS

| | | |
|---|---|---|
| CN | 113529004 A | 10/2021 |
| JP | H11240624 A | 9/1999 |
| WO | WO2017083273 A1 | 5/2017 |

OTHER PUBLICATIONS

Written Opinion and International Search Report for Int'l. Patent Appln. No. PCT/US2022/080309, dated Mar. 13, 2023 (10 pgs).

* cited by examiner

THIN COATINGS FOR HYDRAULIC COMPONENTS

TECHNICAL FIELD

The present disclosure relates to formation of hydraulic components. More specifically, the present disclosure relates to coating hydraulic rods and/or cylinders with thin coatings.

BACKGROUND

Machines are in widespread use in construction, mining, paving, forestry, and other similar industries. These machines are used to perform various tasks, such as lifting, moving, dumping etc. of materials, such as dirt. As a result, these machines are commonly outfitted with work implements, or tools. Tools on machines often include and/or are manipulated by hydraulic systems. The hydraulic systems generally include a cylinder and a piston, or rod, positioned within the cylinder. The hydraulic system is controlled to perform actions by modulating a pressure of a fluid within the cylinder to cause the rod to extend out or retract into the cylinder. The pressure within the cylinder is increased or decreased by using a pump and release mechanism to pressurize or depressurize the hydraulic fluid. As such, the components of the hydraulic system is subjected to high pressures inside the cylinder.

Hydraulic systems often operate in harsh ambient conditions, such as in heat, cold, and/or wet conditions. Harsh operating ambient also accelerates the wear and tear on hydraulic components. For example, operating in the presence of moisture leads to oxidation of the rod, leading to sticking and oil leaking issues when the rod moves within the cylinder of the hydraulic system. In some cases, if the rod is not coated with a film of sufficient coverage, water and other oxidizing agents may penetrate through the coating and result in oxidation of the underlying steel. This leads to bubbles in the coating and further delamination of the protective coating on the rod. Additionally, the oxidized sites on the rod leads to stiction and/or oil leakage during the operation of the hydraulic system.

An example of providing a protective coating on the rod of a hydraulic system is described in Chinese Pat. No. 11,033,135 (hereinafter referred to as the '135 patent). The '135 patent describes a primarily nickel (Ni) coating in the range of 200 μm to 300 μm. This process may require multiple coats of the Ni containing material, resulting in a time-consuming and expensive process. Furthermore, the process of the '135 patent is specific to the Ni containing material and does not apply to other types of thinner and more cost-effective coatings, such as thermal spray coatings having tungsten-carbide (WC) materials.

Example embodiments of the present disclosure are directed toward overcoming the deficiencies described above.

SUMMARY

In an example of the disclosure, a hydraulic component includes a steel surface and a coating disposed over the steel surface. The coating includes tungsten carbide (WC) and the coating has a thickness of less than 100 micrometers (μm). The coating further includes a surface morphology characterized by a peak-to-valley depth (Rz) of 2 μm or less. The coating is still further characterized by a hardness exceeding 1000 Vickers.

In another example of the disclosure, a machine includes a hydraulic component including a steel surface and a high velocity air fuel (HVAF) thermal spray deposited coating. The coating has a thickness of less than 100 micrometers (μm). The coating further includes a surface morphology characterized by a peak-to-valley depth (Rz) of 2 μm or less. The coating is still further characterized by a hardness exceeding 1000 Vickers.

In yet another example of the disclosure, a method includes forming a steel component having a steel surface and grinding the component. The method further includes depositing, using a high velocity air fuel (HVAF) thermal spray, a coating over at least a portion of the steel surface, wherein the coating includes tungsten carbide (WC), cobalt (Co), and chromium (Cr), and wherein the coating has a thickness less than 100 μm. The method still further includes polishing the coating to a peak-to-valley depth (Rz) of 2 μm or less.

DETAILED DESCRIPTION

Figure 1:
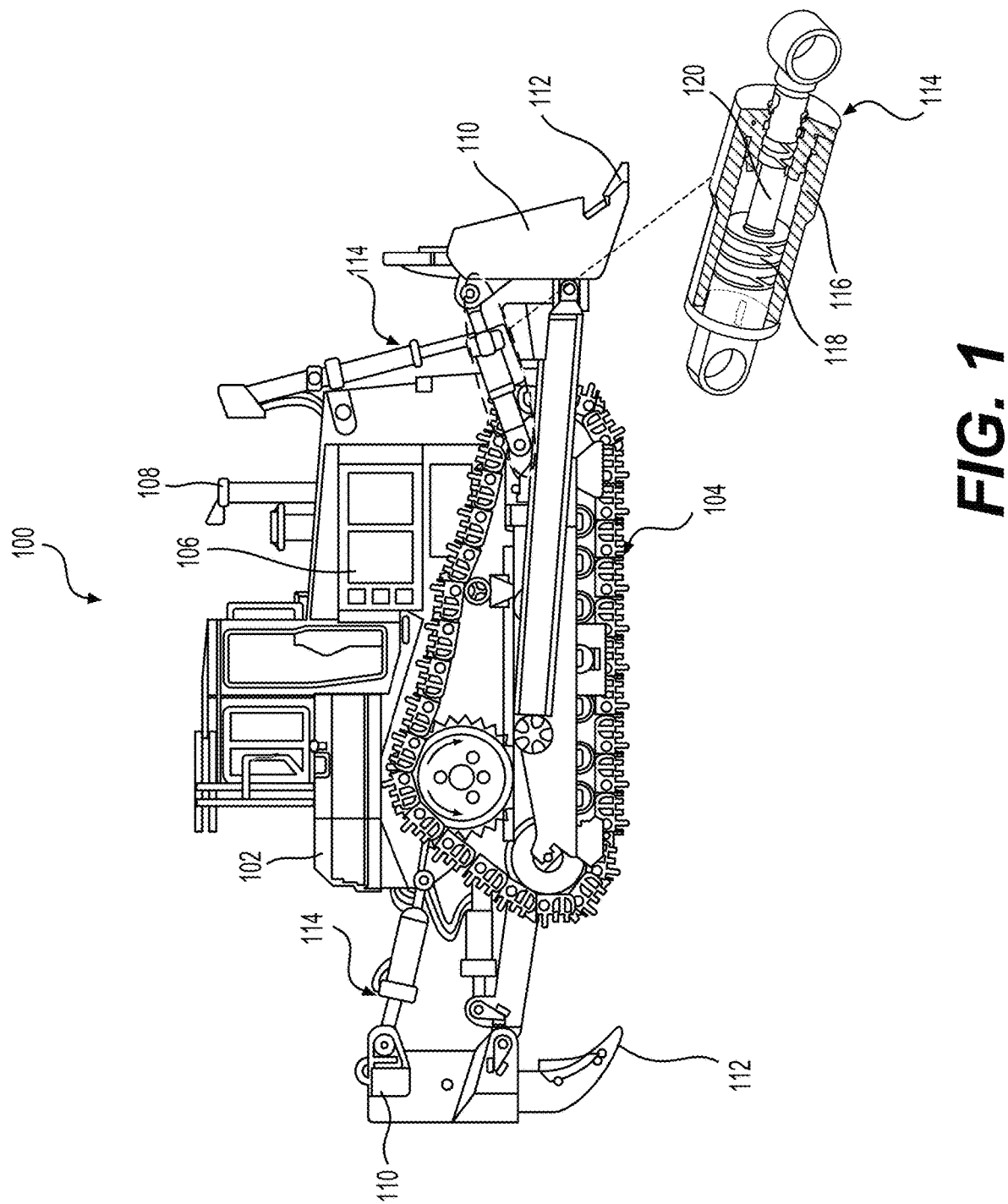
FIG. 1 is a schematic illustration of an example machine with one or more hydraulic components formed in accordance with examples of the disclosure.

Wherever possible, the same reference numbers will be used throughout the drawings to refer to the same or like parts. FIG. 1 is a schematic illustration of an example machine 100 with one or more components formed in accordance with examples of the disclosure. Although the machine 100 is depicted as a dozer, it should be understood that the machine 100 may be of any suitable type, such as those used in construction, farming, mining, paving, transportation, or the like. In other examples, the machine 100 may be any suitable machine 100, such as, a truck, a mining truck, a loader, an excavator, a tank, a backhoe, a drilling machine, a trencher, a combine, or any other on-highway or off-highway vehicle.

The machine 100 includes a frame 102 on which other elements of the machine 100 are mounted. The machine 100 includes a propulsion system 104, such as a track chain assembly, as shown. Alternatively, the machine 100 may have any other suitable type of propulsion system 104, such as wheels and tires. The machine 100 further includes an engine 106, such as an internal combustion engine using hydrocarbon fuels. Alternatively, the machine 100 may be an electrically powered machine. The machine 100 includes an exhaust system 108 and/or one or more work systems 110 with cutting edges 112 that are movable by one or more hydraulic systems 114. The machine 100 also includes a transmission system (not shown) that mechanically couples the engine 106 to the propulsion system 104. According to examples of the disclosure, any component of the machine 100, including any variety of components of the propulsion system 104, the engine 106, the exhaust system 108, the work systems 110, the hydraulic systems 114, the transmission, etc., may be formed by the processes disclosed herein. Additionally, any of the aforementioned components of the machine 100 may have the structure and the resultant material properties as disclosed herein, when formed by the processes disclosed herein. The machine 100 may include any variety of other suitable components not discussed herein that may be formed according to the coatings and processes disclosed herein. For example, some machines 100 may include a suspension system coupling an axle to the frame 102. Such suspension systems may include spring and damper units that dampen ground forces by fluidic mechanisms similar to the hydraulic systems 114.

The hydraulic system 114 includes a cylinder 116, as shown in sectional view, and a piston 118 that is rigidly coupled to a piston rod, or rod 120. The piston 118 and rod 120 are movably coupled to the cylinder 116. The piston 118 is mechanically coupled to the work system 110 to perform work tasks, such as lifting dirt or redistributing gravel. The cylinder 116, piston 118, and/or rod 120, during operation may have relatively high level of stresses imparted on them, such as by pressurized hydraulic fluids. Additionally, the piston 118 and/or rod 120 may impact the cylinder 116 during operation of the hydraulic system 112. Further still, the rod 120 may slide along portions of the cylinder 116 during operation of the hydraulic system 114, resulting in frictional forces, such as along the length of the rod 120. Thus, the cylinder 116 and/or the rod 120 are prone to tribological failures, such as wear and tear on the outer diameter of the rod 120. Additionally, due to the conditions under which they operate, the cylinder 116, piston 118, and/or the rod 120 may be subject to oxidation and/or other forms of corrosion. These types of oxidative defects, such as on the rod 120, may lead to excessive frictional forces, leakage of lubrication oil, leakage of hydraulic fluid, and/or other operational failures and/or degradations of the hydraulic systems 114. The processing mechanisms and material compositions, as disclosed herein, when applied to the rod 120, cylinder 116, and/or the piston 118, results in components that are relatively more corrosion resistant than those covered with hard chrome plating or other, less dense thermal spray coatings, leading to longer lifetimes and/or more optimal operations of the hydraulic systems 114.

In examples of the disclosure, the rod 120, piston 118, and/or the inner diameter of the cylinder 116 may be coated with a thin, dense coating to protect these components from oxidation and/or corrosion, as well as to provide an ideal, or at least improved, surface tropology for the functioning of the hydraulic system 114. For example, the rod 120 may be coated with a coating that provides a surface topology that retains a desired level of surface lubrication on the surface of the rod 120, such that the rod 120 can move in a reciprocating, rotating, and/or telescopic manner within the cylinder 116. Furthermore, the coating may protect the rod 120, or other components of machine 100, from any variety of oxidation and/or corrosion. The coating may be more uniformly coated, contain fewer pinhole defects, provide superior protection of the underlying steel component to corrosive conditions, provide improved adhesion strength, allow for thinner coatings, provide a larger processing window, provide greater hardness, result in greater durability, provide a greater operational lifetime, provide an improved roughness profile, and/or be coated at a reduced cost compared to conventional coatings for the rod 120 or other components of the machine 100. Although the hydraulic system 114 is shown within a dozer, it should be understood that the hydraulic system 114, as disclosed herein, may apply to any suitable machine 100. For example, the hydraulic system 114, with the coatings disclosed herein, may be used in any variety of trucks, such as off-highway trucks, mining trucks, or the like. Such hydraulic systems 114 may be used in any suitable application, such as lifting, suspension, pulling, extension, or the like.

In some cases, conventional coatings on the rod 120 may have poor and/or incomplete coverage that results in moisture incursion to the underlying steel of the rod 120 and subsequent oxidation (e.g., formation of rust) on the steel surface. These surface oxidation locations on the rod 120 may lead to expansion and/or protrusions (e.g., rust bubbles) on the surface of the rod 120. During operation of the hydraulic system 114, the oxidation induced protrusion may be sheared off as the rod 120 moves in and out of the cylinder 116 while in contact with the cylinder 116. This shearing of oxidized regions may lead to additional frictional forces during operation of the hydraulic system 114. Additionally, the increased surface topography resulting from the oxidation sites may result in additional leakage of lubricants and/or hydraulic fluid during operation. These and other issues are avoided and/or mitigated by use of the coatings and/or processes disclosed herein. Suspension system(s) may experience similar failure modes during operation.

In some cases, components other than those associated with the hydraulic systems 114 may be coated with the coatings and the processes disclosed herein. For example, the cutting edge 112 and/or other components of the work systems 110 may also be subject to tribologically and/or thermally harsh operating environments, such as in moving gravel, picking up stones, redistributing asphalt, etc. In many cases, the cutting edge 112 is exposed to repeated impact with hard objects (e.g., rocks) and in some cases may also be subject to relatively high temperatures (e.g., when distributing hot asphalt and/or tar, from frictional heating, etc.). Aspects of the present application enable forming cutting edges 112 and/or other components of the work systems 110 with coatings, such as protective coatings, as disclosed herein. This may allow the cutting edge 112 to have a longer lifetime in use. The engine 106 may include a variety of components that can also be enhanced with the coatings and/or processes, as disclosed herein, to improve the surface properties and/or lifetime of those components.

As another example, the propulsion system 104 may include one or more components, such as track shoes and bushings, that may be exposed to harsh environments with high levels of stresses and frictional forces imparted thereon. For example, the track shoes engage the ground, or other surface, and propel the machine 100 thereon. Thus, the track shoes hold the weight of the entire machine 100, which can be on the order of 10's or even 100's of tons, as it travels over an abrasive surface. Similarly, the bushings grind, with extremely high loading, against other metallic components of the propulsion system 104. This can lead to a variety of issues, such as cracking, galling, and/or other defects. The propulsion system 104, in the form of a track propulsion system, includes other components, such as rolling elements, sprockets, front idlers, rear idlers, track rollers, etc., that operate under harsh conditions where heavy loads and/or high levels of abrasion are imparted thereon. Thus, the propulsion system 104 may include a variety of components that can also be enhanced with the coatings and/or processes as disclosed herein to improve the durability and/or lifetime of those components. Further still, the coatings and processes disclosed herein may be applied to components of suspension system(s), such as suspension systems of trucks (e.g., mining trucks).

According to examples of the disclosure, the rod 120 and/or other components of the hydraulic system 114 and/or the machine 100 may be coated with a coating deposited using a thermal spray. This thermal spray may include a high velocity air fuel (HVAF) process that generates powder temperatures and velocities that are, respectively lower and higher than a more conventional high velocity oxygen fuel (HVOF) process. In example embodiments, the HVAF process may use a powder feedstock that provides a tungsten-carbide (WC) containing coating. In some cases, the coating may further include cobalt (Co) and/or chromium (Cr). For example, the powder feedstock may be approximately 86% WC by weight and Co and Cr as the remainder. For example, the composition of the powder feedstock, as well as the coating, may be approximately 86% WC by weight, 10% Co by weight, and 4% Cr by weight. In other cases, the WC content may range from about 50% by weight to about 95% by weight. In some examples of the disclosure, the powder feedstock may be sintered and crushed, such that the WC particles in the powder are approximately 0.3 μm to about 1.5 μm in size. In other examples of the disclosure, the powder feedstock may be sintered and crushed, such that the WC particles in the powder are approximately 0.5 μm to about 1 μm in size. Although the discussion herein may focus on WC based coatings, it should be understood that any suitable coating, such as Cr based, Ni based coatings, chromium carbide ($Cr_2C_3$) coatings, Stellite alloy coatings, high-Cr/Ni stainless steel alloy coatings, etc., may be used in accordance with the disclosure herein.

The coating may be provided using HVAF thermal spray on the rod 120 with a thickness in the range of about 15 μm to about 80 μm. In other cases, the coating thickness range may be between about 25 μm to about 60 μm. For example, in some cases, the thickness of the coating may be about 40 μm. The coating may have a hardness of approximately 800 Vickers to about 1400 Vickers. In some cases, the coating may have a hardness in the range of about 1100 Vickers to about 1300 Vickers. In yet other cases, the coating may have a hardness in the range of about 1150 Vickers to about 1250 Vickers.

According to examples of the disclosure, the coating may have a surface finish, as measured by $R_z$ and/or $R_zDIN$, less than about 2 μm. As used herein, $R_z$ defines a peak-to-valley depth, as determined by a surface finish measurement tool, such as a profilometer, an optical roughness measurement tools, or the like. As used herein, $R_zDIN$ defines an average peak-to-valley depth of a predetermined number of peaks and valleys over a predetermined scan length, as determined by a surface finish measurement tool, such as a profilometer, an optical roughness measurement tool, or the like. For example, in some cases, a surface profilometer with a diamond tip of radius 5 μm with seven 0.8 mm cutoff sampling lengths (total 5.6 mm) and a Gaussian filter may be used. For example, $R_zDIN$ may be defined as the average peak-to-valley depth of the top five peaks and bottom five valleys over a 5.6 millimeter (mm) profilometer scan. In other words, the $R_zDIN$ may be defined as $R_zDIN=\{(P1+P2+P3+P4+P5)-(D1+D2+D3+D4+D5)\}/5$, where P1, P2, P3, P4, and P5 represent the top five peak heights over a predetermined scan length (e.g., 5.6 mm), and similarly, D1, D2, D3, D4, and D5 are the bottom five valley heights over the predetermined scan length. In some cases, the $R_zDIN$ metric may be used instead of $R_z$ to reduce the effects of any noise and/or sampling error in scanning the surface topology of the coating. In some cases, the $R_z$ and/or $R_zDIN$ of the coating may be in the range of about 0.6 μm to about 1.8 μm. In other cases, the coating may have a $R_z$ and/or $R_zDIN$ value in the range of about 1 μm to about 1.4 μm. The coatings with $R_z$ and/or $R_zDIN$ values, as discussed herein, may result in superior performance in lubricant (e.g., oil) retention on the surfaces of the components of the hydraulic systems 114 (e.g., rod 120, cylinder 116, piston 118, etc.), while reducing the amount of lubricant and/or hydraulic fluid leakage as the rod 120 is stroked within the cylinder 116.

The rod 120, piston 118, cylinder 116, and/or any other components of the machine 100 that is coated with a thermal spray coating, as described herein, may be formed with any suitable material, such as any variety of steel or other metallic materials. For example, the rod 120, piston 118, cylinder 116, and/or any other components of the machine 100 may be formed using American Iron and Steel Institute (AISI) 4130 steel, AISI 4330 steel, any variety of low-carbon steel, any variety of medium carbon steel, any variety of high-carbon steel, any variety of alloy steel, or the like. The HVAF process, as described herein, for forming the coating is able to be deposited directly on these materials, without roughening the component, resulting in reduced pre-deposition and/or post-deposition processing.

The HVAF process, in example embodiments, differs from conventional processes like HVOF in that it generates particles at lower temperatures and higher velocities, which may combine to yield a denser coating with very high adhesion strength. Because the HVAF thermal spray process, using the powder feedstock described herein, results in a denser coating, with reduced pinholes therein, the coating can deliver significantly improved corrosion protection of the underlying substrate with markedly thinner layers compared to conventional HVOF coating techniques. Additionally, the reduction in the number of different operations in forming the coating, along with the ability to use thinner and/or higher quality coatings, results in cost savings compared to conventional techniques for coating the hydraulic system 114 components.

The HVAF process may also allow relatively high coating speed, as well as high surface adhesion. In example embodiments, the HVAF process may entail ejecting coating powders, or feedstock powder, along with air and fuel through a nozzle. The fuel, such as pressurized propane, propylene, natural gas, or the like, along with pressurized air may carry the coating powder in its combustion flame as this mixture is provided through a nozzle. For example, the coating powder may be a WC based powder for depositing WC on the hydraulic system 114 components, such as the rod 120. Because the HVAF thermal spray process using the powder feedstock described herein results in a relatively high adhesion strength to the underlying steel surface of the component being coated, the component does not need to be roughened prior to spraying on the coating, unlike with HVOF processes that typically require a roughening process, such as grit blasting.

Additionally, the HVAF thermal spray process may be used to deposit a relatively thin coating, such as a layer that is less than 100 µm thick. After coating the component, such as rod 120, a post-grind process may not be needed due to decreased coating surface roughness resulting from spraying onto a smooth surface rather than a rougher surface, as is typically used when coating using HVOF. Thus, the elimination/reduction of the pre-roughening process, along with the elimination/reduction of the post-grinding process, and further along with the capability to deposit a thinner coating on the component without reducing corrosion protection may result in reduced processing time, and therefore, reduced cost of forming the component with the coating described herein.

Figure 2:
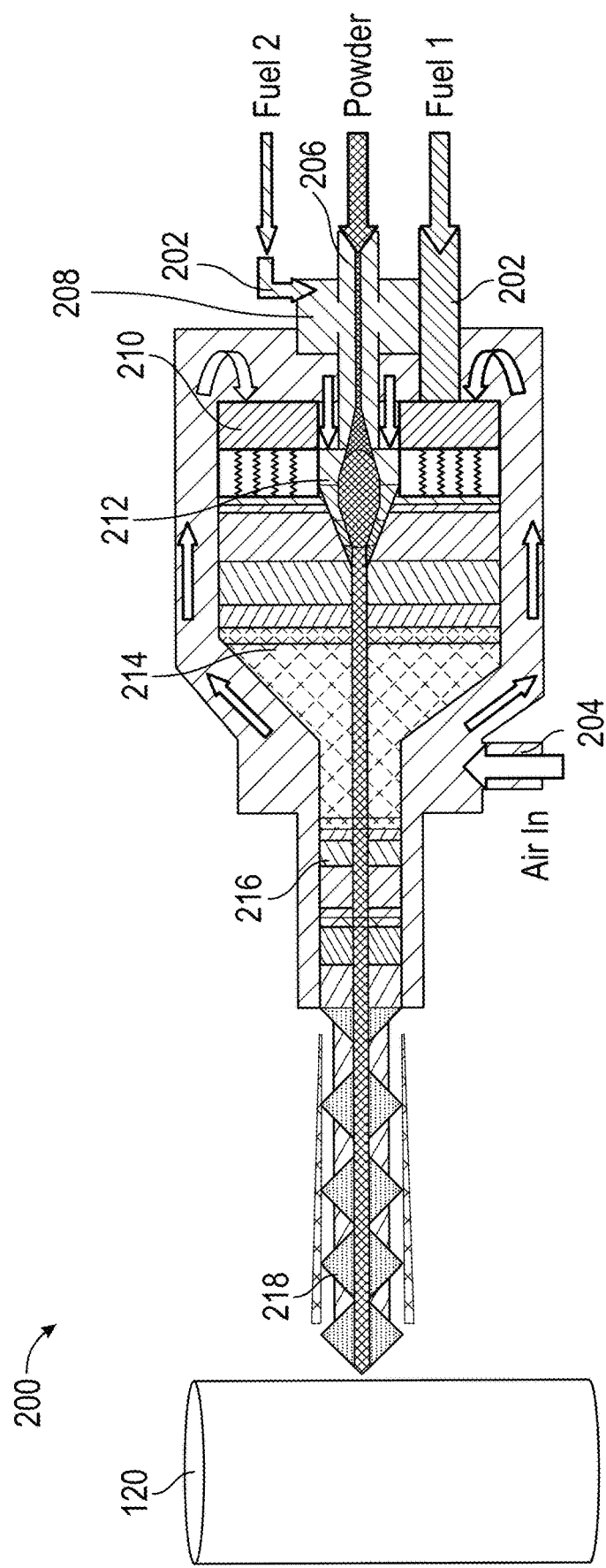
FIG. 2 is a schematic illustration of an example thin film coating system to form the hydraulic components of the machine as depicted in FIG. 1, according to examples of the disclosure.

FIG. 2 is a schematic illustration of an example thin coating system 200 to form the hydraulic components 116, 118, 120 of the machine 100 as depicted in FIG. 1, according to examples of the disclosure. The coating system 200, also referred to as HVAF thermal spray coater 200 includes fuel inlet(s) 202 for one or more fuels used to perform the HVAF thermal spray process, an air inlet 204, and a powder inlet 206. The HVAF thermal spray coater 200 further includes a powder-fuel mixing chamber 208, a gas mixing chamber 210, a pre-chamber 212, and combustion chamber 214, and a nozzle 216.

During operation, any variety of suitable fuel may be provided to the HVAF thermal spray coater 200 via the fuel inlet(s) 202. The fuel may be any variety of fuel that can be combusted in the presence of air and the powder feedstock. For example, the fuel may include any variety of gas-phase hydrocarbon fuels, such as propane, propylene, natural gas, etc. The air may be provided from a pressurized tank via the air inlet 204. The powder feedstock is provided via the powder inlet 206. The powder feedstock is described in greater detail in conjunction with FIG. 4.

The powder feedstock may mix with the one or more fuels in the powder-fuel mixing chamber 208. This mixture of powder and fuel flows to the gas mixing chamber 208, where the powder and fuel mixture further mixes with the air. The powder, fuel, and air mixture then flows through the pre-chamber 212, where additional mixing takes place, to the combustion chamber 214 where the mixture is ignited. This ignited mixture then flows through the nozzle 216, as a thermal spray 218. The fuel and air carries the powder in its stream, as the thermal spray 218 the nozzle 216. As the thermal spray 218 comes in contact with the surfaces of the components that are to be coated, the materials in the powder stick to the surfaces to be coated to provide the coating.

The coating may be deposited on the component by scanning or traversing the nozzle 216, such as by moving the HVAF thermal spray coater 200 in a scanning motion, over the surface of the of the component regions to be coated. Alternatively, the regions of the component that are to be coated may be traversed within the thermal spray 218. For example, the thermal spray 218 may be scanned over the outer surface (e.g., outer diameter) of the rod 120 to provide a coating on the outer surface of the rod 120. As another example, the thermal spray 218 may be scanned over the outer surface of the piston 118. As yet another example, the thermal spray may be scanned over the inner surface (e.g., the inner diameter) of the cylinder 116. In some cases, if geometrical limitations prevent a full scale scanned of the surface to be coated, as may be the case for the cylinder 116, the thermal spray 218 may be provided as close to as possible to the surface to be coated. For example, the thermal spray may be provided at one of the open ends of the cylinder 116 to enable coating the inner surface of the cylinder 116.

With the HVAF thermal spray process the lower thermal spray flame and particle temperatures promote good adhesion between the materials in the powder feedstock and the underlying steel surface of the component. Because of the good adhesion characteristics, the HVAF thermal spray process may obviate the need for grit-blasting the component surface prior to coating. Grit-blasting is often needed with conventional coating techniques, such as HVOF, to roughen the surface of the component to promote adhesion of the coating to the roughened steel surface of the component. Moreover, applying the HVAF coating directly onto a smoother, non-roughened surface results in lower roughness of the as-sprayed HVAF coating surface after deposition, which can decrease the amount of grinding or polishing time required to achieve a desired surface finish, as compared to conventional coating techniques, such as HVOF. Thus, the elimination of the grit-blasting process, resulting from the disclosure herein, reduces the cost of coating machine 100 components that manifest in reduced cost of the end components.

When grit-blasting is used in conventional techniques for providing protective coatings, the steel surface is often roughened in a non-uniform manner. Additionally, grit often gets embedded on the steel surface of the components. To compensate for such surface non-uniformities, conventional techniques often provide a much thicker coating than what is need for the techniques disclosed herein. For example, in conventional techniques, coating thicknesses may be around 300 µm or more. The thicker coatings used in conventional techniques are then ground back to provide an adequate surface uniformity and smoothness. For example, the coating, using conventional techniques may be ground back to about 180 µm or so. The techniques disclosed herein provide the ability to deposit the coating directly on the smooth steel surface of the component without a pre-roughening process (e.g., grit-blasting). As a result, thinner coatings can be deposited, as disclosed herein, such as under 100 µm, and as low as 15 µm or so. Additionally, since the pre-roughening and the post-grinding processes are not performed, this techniques described herein result in cost savings compared to conventional techniques.

The coating, as disclosed herein, allows for desired levels of surface finish, hardness, density, and strain tolerance. A polishing step, rather than a grinding step used with conventional processes, provides desired $R_Z$ and/or $R_{ZDIN}$ surface morphology of less than 2 µm. The composition of the coating, as disclosed herein, provides preferred levels of hardness exceeding 800 Vickers, and in some cases, exceeding 1300 Vickers. Additionally, the coating, as disclosed herein, has a fine grain structure as a result of the HVAF coating process and preferential feedstock powder size, microstructure and composition. This allows for a denser film that can adequately protect the underlying component with a thinner coating thickness. The thinner coating provides various advantages compared to conventional coating films. The substantial mismatch in the elastic modulus between the steel of the component and the coating results in strain and/or stress induced defects during use, such as chipping or delamination, especially if bending stresses are generated within the coated component. By using a thinner coating, the strain tolerance is improved in the machine 100 components disclosed herein. Furthermore, the fine-grain structure of the coating allows for superior sealing performance compared to conventional coating techniques. For example, the rod 120 rod with the coating, as disclosed herein, provides greater than 100 hours of sealing protection and low leakage of lubricant and/or hydraulic fluid during operation.

Figure 3:
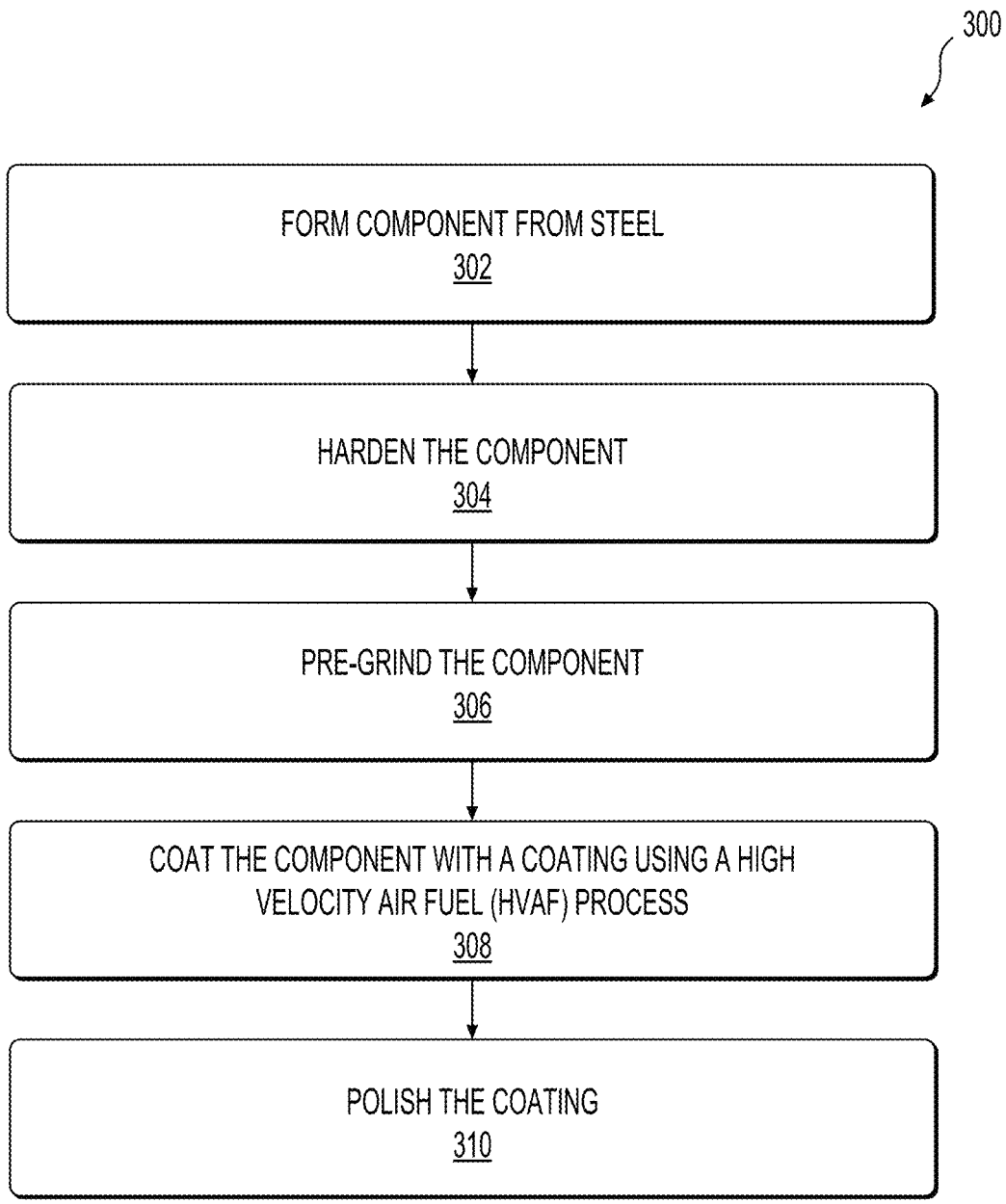
FIG. 3 is a flow diagram depicting an example method for forming the hydraulic components with thin film coatings of the machine as depicted in FIG. 1, according to examples of the disclosure.

FIG. 3 is a flow diagram depicting an example method for forming the hydraulic components with thin film coatings of the machine as depicted in FIG. 1, according to examples of the disclosure. The method 300 may be performed using any suitable component, as discussed herein. In examples of the disclosure, the component may be any variety of components associated with the hydraulic systems 114, such as the cylinder 116, piston 118, and/or rod 120. In other examples, the components may be any other part of the machine 100, such as components from the engine 106 and/or the propulsion system 104. In some examples, the method 300 may be applied to components (e.g., cylinder, strut, etc.) of suspension systems, such as suspension systems of trucks.

At block 302, the component is formed with steel. This is a formation of the component, such as the cylinder 116, the piston 118, the rod 120, etc., prior to subsequent processing. The component may be formed using any suitable type of steel, such as AISI 4130 steel, AISI 4330 steel, low alloy steel, any variety of low-carbon steel, any variety of medium carbon steel, any variety of high-carbon steel, any variety of alloy steel, or the like. The component may be formed by any suitable mechanism such as any suitable hot formation mechanism and/or machining technique. For example, any type of casting, rolling, hot rolling, cold rolling, extrusion, combinations thereof, or the like may be used to form the rough component. Additionally or alternatively, the rough component may be formed by any variety of machining techniques suitable for forming the component, such as any type of shaping, turning, milling, drilling, grinding, chiseling, lathing, and/or other machining techniques.

The component, during rough formation, may be any suitable crystal structure, such as ferrite, pearlite, bainite, cementite, martensite, and/or austenite. In some cases, the starting steel may have a relatively high level of relatively softer ferrite and/or pearlite crystal structure. The initial low, medium, or high carbon steel may be relatively soft and ductile, allowing for easier formation of the rough component, such as the cylinder 116. For example, the steel may have an initial hardness in the range of about 35 HRC to about 50 HRC. In some cases, if the starting steel is not sufficiently soft, then a tempering process may be performed. In examples, the tempering process may be conducted at an under the carbon-steel eutectic temperature for a multi-hour anneal prior to forming the rough component. For example, the steel may be held at 200° C. for 3 hours to temper the steel prior to rough forming the component. The temperature and/or time ranges here, and throughout the disclosure, are examples, and temperatures and time periods shorter or longer may be used in accordance with examples of the disclosure.

At block 304, the component is hardened. After forming the shape of the component, the component may be subjected to any variety of operations to provide a suitable hardness, grain structure, and/or stress/strain profile. For example, any variety of hardening operations may be performed, such as a furnace heating and quenching process to harden the steel. Alternatively, other surface hardening operations, such as carburization, hardfacing, or the like may be performed. As a result of any post-formation hardening techniques, the hardness of the surface regions of the component may be in the range of about 45 HRC to about 65 HRC. For example, the component, such as the rod 120, may have a hardness of about 56 HRC. After hardening, the crystal structure of the component may be primarily martensitic and/or austenitic.

In some cases, an induction heating operation is performed for case hardening the component. The induction heating process may be performed on the surface of the component. For example, in the case of the cylinder 116, induction heating may be performed from the inner surface within the cylinder 116. The induction heating process may heat a relatively small depth from the surface of the component to temperatures that harden the steel. After induction heating, the component may be quenched, such as by forced air quenching, oil quenching, or the like, to harden a region proximal to the surface of the component. The depth of the hardening, in some cases, may be about 2 mm to about 5 mm in from the surface of the component. Thus, the component may have a hardness profile such that the region proximal to the surface is relatively hard and the rest of the component is relatively soft compared to the surface. Additionally, the relatively hard portion of the component and the rest of the component have substantially the same carbon concentrations and composition. In some examples, the hard portion of the component at the surface may be under compressive stress, while the rest of the component may be under tensile stress. The hardness of the surface of the component, after the hardening process may be in the range of about 45 HRC to about 65 HRC. For example, the component, such as the cylinder 116, may have a hardness of about 56 HRC.

At block 306, the component is pre-ground. This pre-grinding process may be optional and may result in the component being ground to a controlled dimension and form. In some cases, this pre-grind may smoothen the surface of the component, removing any roughness that may have resulted from the component formation and/or hardening processes.

At block 308, the component is coated with the coating by using the HVAF thermal spray process. The HVAF thermal spray process combined with the powder feedstock, disclosed herein, provides the preferential material, structural, and process properties discussed herein. As discussed in conjunction with FIG. 2, the coating may be deposited on the component by scanning or traversing the nozzle 216 relative to the surface of the of the component to be coated. In this way, the materials in the powder feedstock stick to the surface of the steel of the component to form the coating.

The HVAF thermal spray process may use a powder feedstock that provides a WC containing coating. In some cases, the coating may further include Co, Cr, and/or any other suitable material. For example, the powder feedstock may be approximately 86% WC by weight and Co and Cr as the remainder. For example, the composition of the powder feedstock, as well as the coating, may be approximately 86% WC by weight, 10% Co by weight, and 4% Cr by weight. In other cases, the WC content may range from about 50% by weight to about 97% by weight. In some examples of the disclosure, the powder feedstock may be sintered and crushed, such that the WC particles in the powder are approximately 0.3 µm to about 1.5 µm in size. In other examples of the disclosure, the powder feedstock may be sintered and crushed, such that the WC particles in the powder are approximately 0.5 µm to about 1 µm in size. Although the discussion herein may focus on WC based coatings, it should be understood that any suitable coating, such as Cr based, Ni based coatings, $Cr_2C_3$ coatings, Stellite alloy coatings, high-Cr/Ni stainless steel alloy coatings etc., may be used in accordance with the disclosure herein.

The coating may be provided using HVAF thermal spray on the component with a suitable thickness, such as less than 100 μm. For example the coating may be deposited in the range of about 15 μm to about 80 μm. In other cases, the coating thickness range may be between about 25 μm to about 60 μm. For example, in some cases, the thickness of the coating may be about 40 μm. It may take approximately 5 minutes to about 20 minutes to coat the component, depending on the area of the surface to be coated. In some cases, the time need to coat the surface of the component may be 10 times, or more, faster than conventional techniques, such as HVOF.

Due to the hardness of WC, the coating may have a relatively high level of hardness. For example, the coating may have a hardness of approximately 800 Vickers to about 1400 Vickers. In some cases, the coating may have a hardness in the range of about 1100 Vickers to about 1300 Vickers. In yet other cases, the coating may have a hardness in the range of about 1150 Vickers to about 1250 Vickers.

At block 310, the component is polished. The polishing process can be performed by any suitable mechanism, such as tape polishing. For example, a 20 μm diamond superfinishing tape/belt may be used to polish the surface of the component. Due to the relatively high as-deposited smoothness, only a few passes of the tape may be needed to polish the surface of the component. In other words, the polish may be a relatively quick and inexpensive process compared to what is needed for conventional techniques of depositing the coating.

After the polish operation, the coating may have a surface finish, as measured by $R_z$ and/or $R_zDIN$, less than about 2 μm. In some cases, the $R_Z$ and/or $R_{ZDIN}$ of the coating may be in the range of about 0.6 μm to about 1.8 μm. In other cases, the coating may have a $R_z$ and/or $R_zDIN$ value in the range of about 1 μm to about 1.4 μm. The coatings with $R_z$ and/or $R_zDIN$ values, as discussed herein, may result in superior performance in lubricant (e.g., oil) retention on the surfaces of the components of the hydraulic systems 114 (e.g., rod 120, cylinder 116, piston 118, etc.), while reducing the amount of lubricant and/or hydraulic fluid leakage as the rod 120 is stroked within the cylinder 116. In general, the HVAF thermal spray process, with a smoother surface, may allow for a greater process window for the polish process compared to conventional techniques, such as HVOF.

It should be appreciated that the method 300 does not include a roughening (e.g., grit blasting) operation prior to HVAF thermal spray coating of the component, as is often used with conventional techniques. Furthermore, because a relatively thick coating was not deposited, as is often the case with conventional techniques, a post-grind process is also not needed. The elimination of these relatively time-consuming operations, may reduce the cost of manufacturing the component, as described herein, relative to conventional methods of manufacturing these components. Additionally, the method 300 results in components with preferred surface morphology, hardness, and stress profiles, compared to conventional techniques.

It should be noted that some of the operations of method 300 may be performed out of the order presented, with additional elements, and/or without some elements. Some of the operations of method 300 may further take place substantially concurrently and, therefore, may conclude in an order different from the order of operations shown above.

Figure 4:
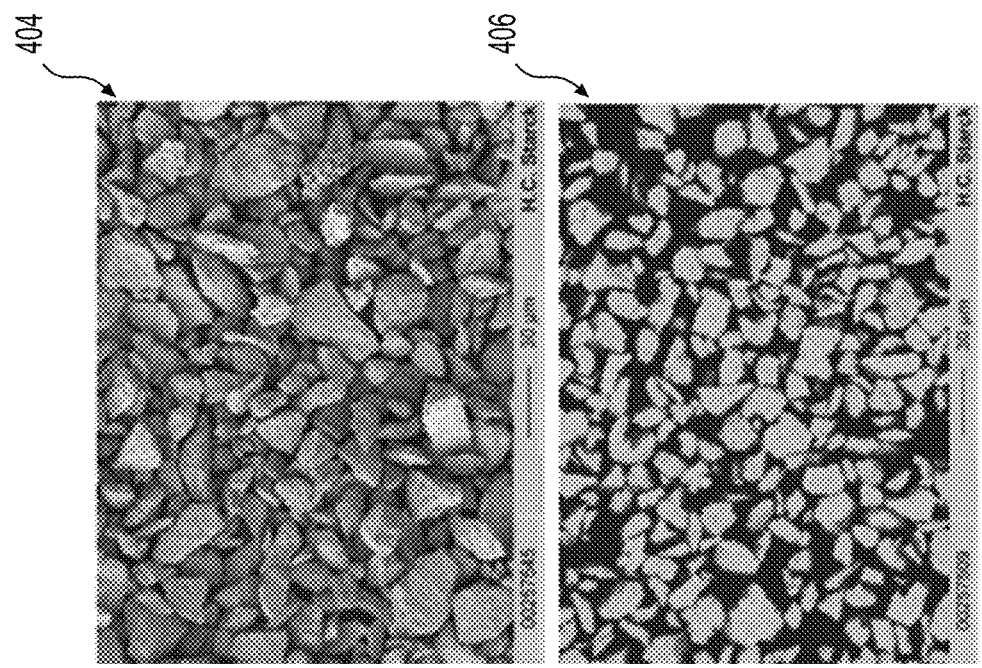
FIG. 4 illustrates photomicrographs depicting example powder for depositing the thin film coatings of hydraulic components of the machine as depicted in FIG. 1, according to examples of the disclosure.
Figure 4:
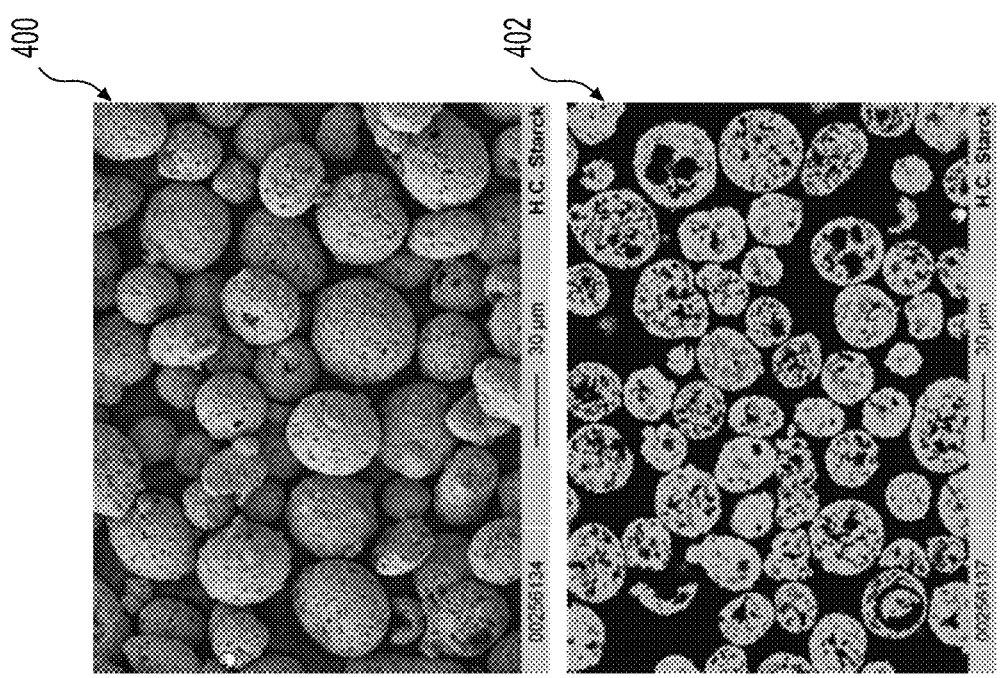

FIG. 4 illustrates photomicrographs depicting example powder 400, 402, 404, 406 for depositing the thin film coatings of hydraulic system 114 components of the machine 100 as depicted in FIG. 1, according to examples of the disclosure. As shown, the powder 400 includes approximately 86% WC by weight, 10% Co by weight, and 4% Cr by weight, and is processed by spray drying of agglomerated WC, Co and Cr particles, as observed by the relatively round shape of the powder feedstock, and subsequently sintered. Powder 402 is the same powder feedstock as powder 400, but the powder 400 is polished to show cross-sectional views of the powder 402. The agglomerated and sintered powder 400 may be used in the HVAF thermal spray operation, such as the operation of block 308 of FIG. 3, to provide the coating with the properties as discussed herein.

Powder 404 shows the same powder feedstock at powder 400, In other words, the powder 404 includes approximately 86% WC by weight, 10% Co by weight, and 4% Cr by weight, but the powder 404 is processed by sintering together a pressed mixture of WC, Co and Cr particles to form a dense monolith, followed by crushing of the sintered monolith by any suitable mechanism, such as between rollers imparting compressive and/or shear forces to form the dense, angular particles shown in 404. Powder 406 is the same powder feedstock as powder 404, but the powder 406 is polished to show cross-sectional views of the powder 404. The sintered and crushed powder 404 may be used in the HVAF thermal spray operation, such as the operation of block 308 of FIG. 3, to provide the coating with the properties as discussed herein. Both the agglomerated and sintered powder 400 and the sintered and crushed powder 404 are suitable for forming the dense coating with high adhesion strength, as disclosed herein.

Figure 5:
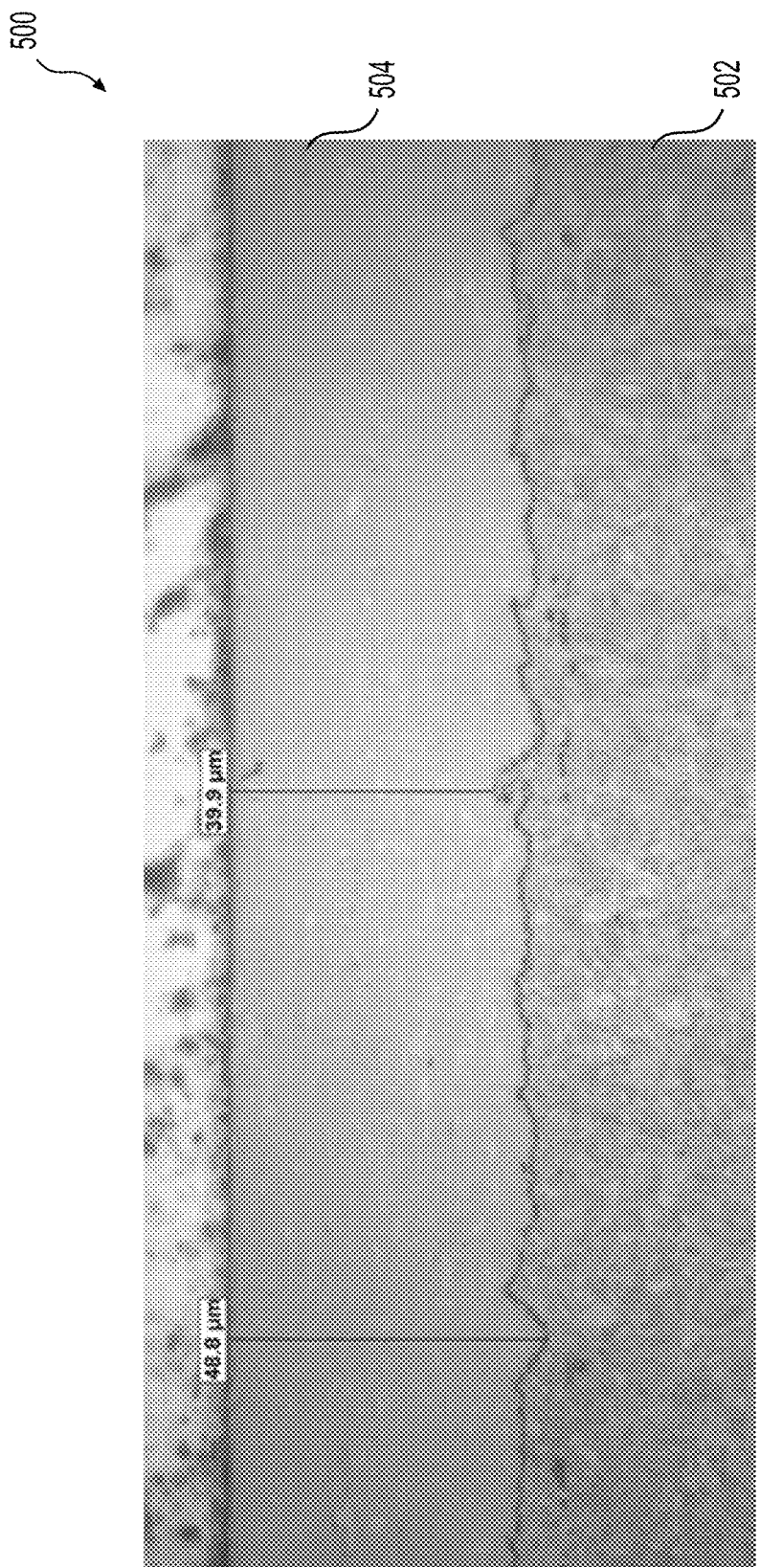
FIG. 5 is a polished cross-sectional image of an example component surface with the steel surface and the coating thereon, according to examples of the disclosure.

FIG. 5 is a cross sectional illustration of an example component 500 with the steel surface 502 and the coating 504 thereon, according to examples of the disclosure. As shown the interface between the steel surface 502 and the coating 504 is smooth. The coating 504 is very dense and has relatively few pinhole defects, if any. This film allows for long protection times against corrosion and/or oxidation. For example, the component 500 may have a lifetime of 1000 hours or more in either neutral or acetic acid salt spray testing with this relatively high-quality coating 504. In some cases, the component 500 may have a lifetime of 3000 hours or more in the field. In other cases, the component 500 may have a lifetime of 6000 hours or more in the field.

Figure 6:
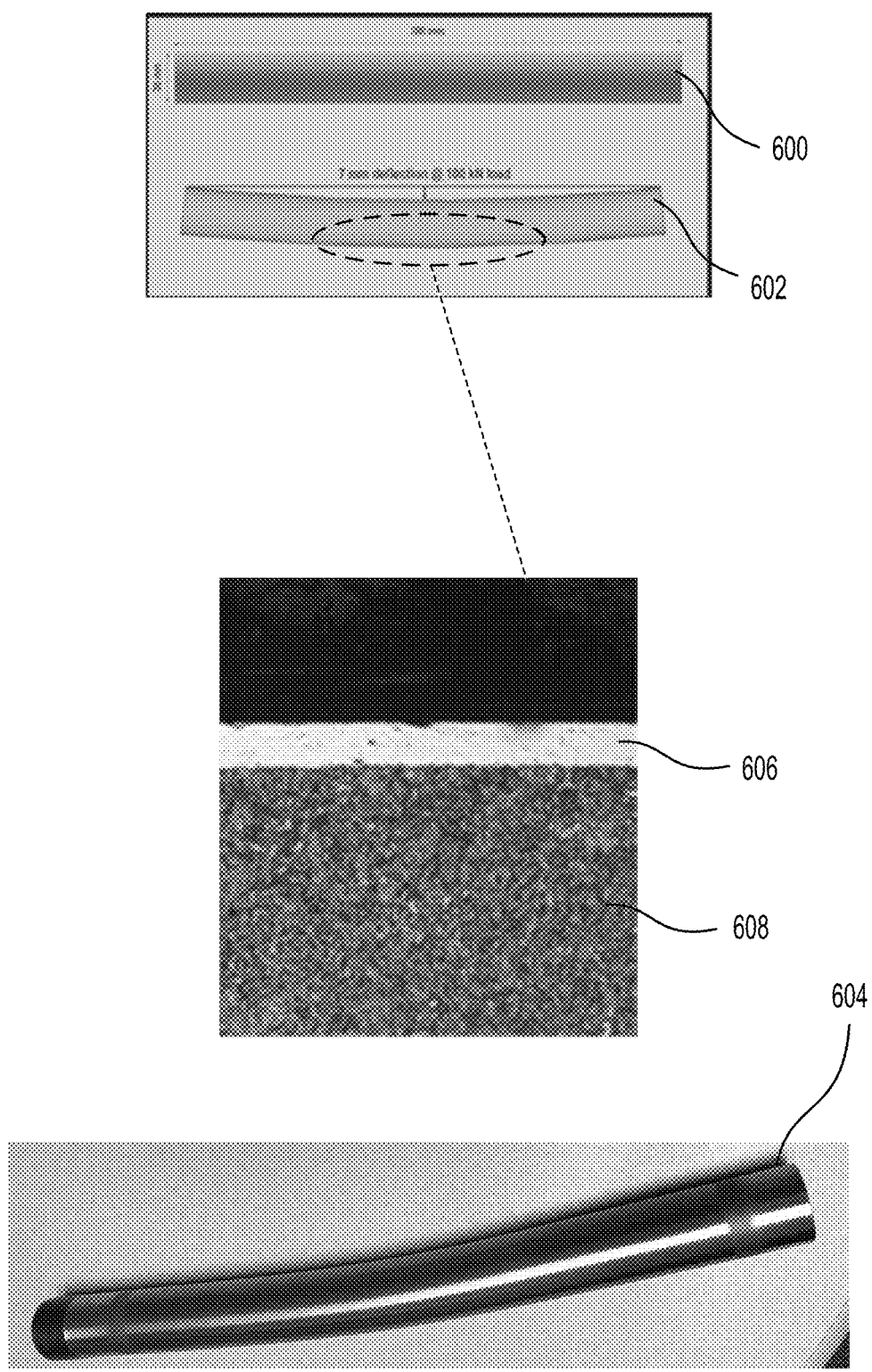
FIG. 6 is a sectional illustration and photomicrograph of an example rod with the thin coating subjected to a bend test, according to examples of the disclosure.

FIG. 6 is an example rod 600 with the thin HVAF coating, according to examples of the disclosure, subjected to a bend test. The rod 600, with a 380 mm length and 38 mm diameter, is subjected to a force of 100 kiloNewtons (kN), resulting in a 7 mm deflection of the rod 600. The schematic view of the bent rod 602 and photograph of the bent rod 604 are shown. Even with this level of bending, the coating 606, as deposited according to the disclosure herein, is completely adhered to the underlying steel 608 of the rod 600.

Figure 7:
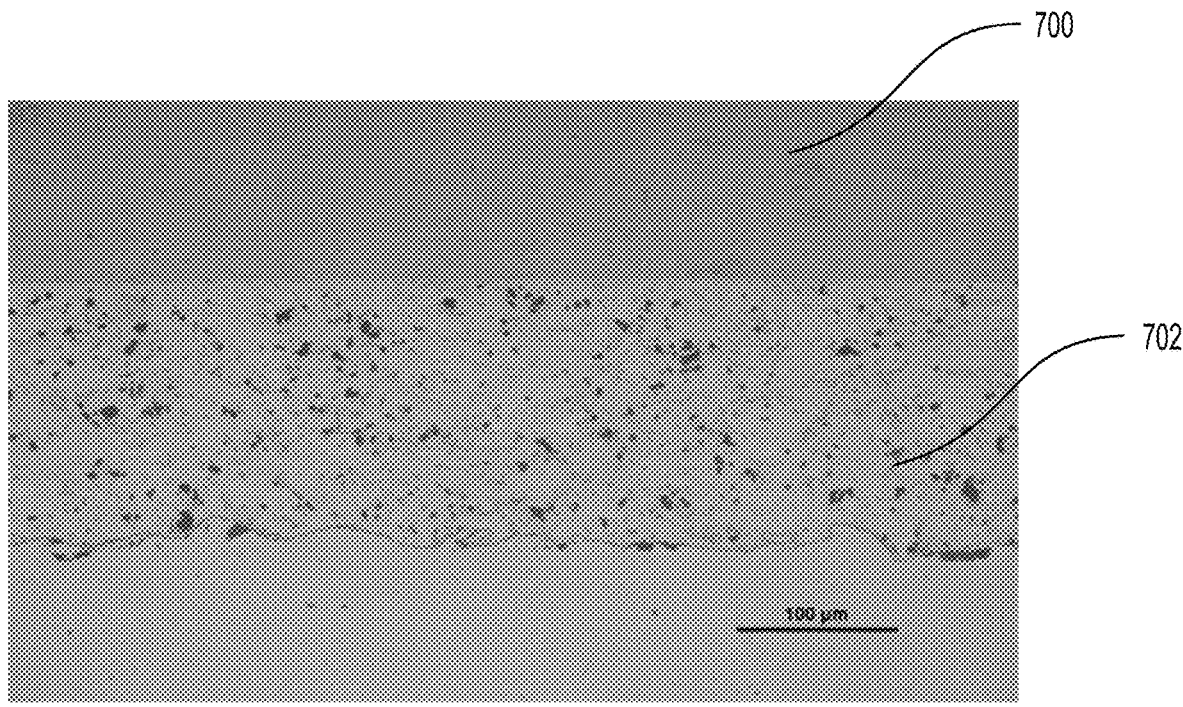
FIG. 7 illustrates polished cross-sectional photomicrographs of a thin, dense coating, according to examples of the disclosure, as well as a coating deposited by a conventional mechanism.

FIG. 7 illustrates cross sectional views of a thin HVAF coating 700, according to examples of the disclosure, deposited directly onto an existing coating 702 deposited by conventional mechanisms. The coating 700 is denser and has fewer openings and/or defects therein compared to coating 702. It should be understood that the superior coating 700 can be fabricated using the material compositions, powder feedstock, and/or the processes disclosed herein. The component coating 700, as fabricated may provide enhanced resistance to corrosion and/or oxidation, particularly when the component is operated in harsh conditions (e.g., acidic conditions, oxidative environments, etc.). Additionally, the coating 700 provides advantageous surface morphology for lubrication, high hardness, and high levels of adhesion to the underlying steel.

INDUSTRIAL APPLICABILITY

The present disclosure describes systems, structures, and methods to coat components of machine 100, such as components of the hydraulic system 114. The components of the hydraulic system 114 may include, for example, a cylinder 116, a piston 118, and/or a rod 120. The coating may be provided on the component of the machine 100 to provide a hard protective layer that prevents and/or reduces oxidation and/or corrosion of the steel with which the component is formed. The coating also provides a preferred surface morphology that promotes adhesion of lubricants on the surface of the component, while reducing the leakage of oil and/or hydraulic fluids. The coatings and the processing thereof, as disclosed here, using HVAF thermal spray provides a dense coating with strong adhesion strength to the underlying steel of the component, compared to conventional HVOF techniques. Furthermore, the HVAF based coatings result in the elimination and/or reduction of processing steps that lead to a reduction in the cost of providing this protective coating on the surface of the components.

As a result of the systems, apparatus, and methods described herein, parts of machines 100, such as cylinder 116, piston 118, and/or rod 120, may have a greater operational lifetime. For example, the hydraulic system 114 components described herein may have greater service lifetime than traditional hydraulic system 114 components that do not have the protective coating, as described herein. In some cases, components, such as the rod 120, may allow for a significant improvement in the wear lifetime of parts of the machines 100. For example, the coated rods may have operational lifetimes exceeding 3000 hours, or even 6000 hours or more, which is longer than conventionally coated rods. In some other cases, a first repair (reseal and/or repolish without recoating) of a hydraulic or suspension system, according to the disclosure herein, may be in the range of about 4000 hours to about 20,000 hours. This reduces field downtime, reduces the frequency of servicing and maintenance, and overall reduces the cost of heavy equipment, such as machines 100. The improved reliability and reduced field-level downtime also improves the user experience such that the machine 100 can be devoted to its intended purpose for longer times and for an overall greater percentage of its lifetime. Improved machine 100 uptime and reduced scheduled maintenance may allow for more efficient deployment of resources (e.g., fewer, but more reliable machines 100 at a construction site). Thus, the technologies disclosed herein improve the efficiency of project resources (e.g., construction resources, mining resources, etc.), provide greater uptime of project resources, and improves the financial performance of project resources.

In addition to the improved lifetimes of coated components, the coated components may have preferred surface morphology that result in improved operational performance. For example, the rod 120 may have a surface morphology that promote lubrication adhesion during operation and further results in low levels oil leakage or hydraulic fluid leakage. Thus, the preferred surface morphology of the coatings described herein result in improved performance of the coated components.

Although the processes of forming protective coatings are discussed in the context of various hydraulic system 114 components, it should be appreciated that the mechanisms discussed herein may be applied to a wide array of mechanical parts in a wide variety of systems used in any variety of industries. For example, the protective coatings discussed herein may be applied to industrial fabrication equipment, like metal working equipment, construction equipment, or automotive parts.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein.

What is claimed is:

1. A hydraulic component, comprising:
   a steel surface; and
   a coating disposed over the steel surface, wherein:
   the coating comprises approximately 50% to approximately 75% tungsten carbide (WC) by weight,
   the WC particles of the coating are larger than approximately 0.3 µm in size but smaller than 1 µm in size,
   the coating has a thickness of less than 100 micrometers (µm), and
   the coating includes a surface morphology characterized by a peak-to-valley depth (Rz) of 2 µm or less.

2. The hydraulic component of claim 1, wherein the hydraulic component comprises at least one of: (i) a rod, (ii) a cylinder, or (iii) a piston.

3. The hydraulic component of claim 1, further comprising:
   a steel bulk portion, wherein the steel surface overlies the steel bulk portion, wherein the steel bulk portion comprises at least one of: (i) American Iron and Steel Institute (AISI) 4130 steel, (ii) AISI 4330 steel, or (iii) low alloy steel.

4. The hydraulic component of claim 1, wherein the coating further comprises cobalt (Co) and chromium (Cr).

5. The hydraulic component of claim 1, wherein the coating has a thickness less than 25 µm.

6. The hydraulic component of claim 1, wherein the coating is deposited by high velocity air fuel (HVAF) thermal spray.

7. A machine, comprising:
   a hydraulic component including a steel surface and a high velocity air fuel (HVAF) thermal spray deposited coating comprising approximately 50% to approximately 75% tungsten carbide (WC) by weight, wherein:
   the coating has a thickness of less than 100 micrometers (µm),
   the coating includes a surface morphology characterized by a peak-to-valley depth (Rz) of 2 µm or less, and
   the coating including WC particles that are larger than approximately 0.3 mm in size but smaller than 1 mm in size.

8. The machine of claim 7, wherein the coating further comprises cobalt (Co) and chromium (Cr).

9. The machine of claim 7, wherein the steel surface comprises at least one of: (i) American Iron and Steel Institute (AISI) 4130 steel, (ii) AISI 4330 steel, or (iii) low alloy steel.

10. The machine of claim 7, wherein the steel surface comprises a hardness of at least 50 Rockwell Hardness Scale C (HRC).

11. The machine of claim 7, wherein the coating has a thickness less than 25 μm.

12. The machine of claim 7, wherein the coating is characterized by an Rz of 1.4 μm or less.

13. A coating applied to a steel surface of a hydraulic component, the coating comprising:
- approximately 50% to approximately 75% tungsten carbide (WC) by weight;
- WC particles that are larger than approximately 0.3 mm in size but smaller than 1 mm in size;
- a thickness of less than 100 micrometers (μm); and
- a surface morphology having a peak-to-valley depth (Rz) of 2 μm or less.

14. The coating of claim 13, further comprising:
cobalt (Co) and chromium (Cr).

15. The coating of claim 13, wherein the coating has a thickness less than 25 μm.

16. The coating of claim 13, wherein the coating is deposited by high velocity air fuel (HVAF) thermal spray.

17. The coating of claim 13, wherein the steel surface comprises at least one of: (i) American Iron and Steel Institute (AISI) 4130 steel, (ii) AISI 4330 steel, or (iii) low alloy steel.

* * * * *